(12) United States Patent
Palmore et al.

(10) Patent No.: US 8,435,696 B2
(45) Date of Patent: May 7, 2013

(54) REDOX-ACTIVE POLYMERS AND THEIR APPLICATIONS

(75) Inventors: G. Tayhas R. Palmore, Providence, RI (US); Jiangfeng Fei, Pawtucket, RI (US); Hyun-Kon Song, Daejeon (KR)

(73) Assignee: Brown University, Providence, RI (US)

( * ) Notice: Subject to any disclaimer, the term of this patent is extended or adjusted under 35 U.S.C. 154(b) by 23 days.

(21) Appl. No.: 12/905,398

(22) Filed: Oct. 15, 2010

(65) Prior Publication Data
US 2011/0031440 A1 Feb. 10, 2011

Related U.S. Application Data

(62) Division of application No. 11/512,430, filed on Aug. 29, 2006, now Pat. No. 7,838,687.

(60) Provisional application No. 60/712,724, filed on Aug. 29, 2005.

(51) Int. Cl.
*H01M 8/10* (2006.01)

(52) U.S. Cl.
USPC .......................................... 429/482; 429/484

(58) Field of Classification Search .................. 429/482, 429/484
See application file for complete search history.

(56) References Cited

U.S. PATENT DOCUMENTS

| 2001/0030794 A1 | 10/2001 | Berneth et al. | 359/273 |
|---|---|---|---|
| 2003/0113611 A1* | 6/2003 | Abe et al. | 429/43 |
| 2004/0182719 A1* | 9/2004 | Purvis et al. | 205/414 |
| 2007/0105112 A1 | 5/2007 | Hitchman et al. | 435/6 |

OTHER PUBLICATIONS

Christ, Jr., et al., "Intermolecular and Intramolecular Excited-State Electron Transfer Involving Electrode-Confined Rhenium Carbonyl Complexes: Toward Molecule-Based Systems for Light Absorption, Charge Separation, and Optical Energy Conversion", Inorganic Chemistry, 1992, vol. 31, pp. 4439-4440.

Corbin et al., "1-Alkyl-(or aryl-) amino-2-methylpropane-l-thiols. Some Bi- and Tetradentate Nitrogen-Sulfur Ligands from Schiff's Base Disulfides", J. Org. Chem. 1976, vol. 41, No. 3, pp. 489-491.

Foulds et al., "Immobilization of Glucose Oxidase in Ferrocene-Modified Pyrrole Polymers", Anal. Chem. 1988, vol. 60, pp. 2473-2478.

(Continued)

*Primary Examiner* — Peter D Mulcahy
(74) *Attorney, Agent, or Firm* — Preti Flaherty Beliveau & Pachios LLP

(57) ABSTRACT

The present invention is directed to a redox-active, conducting polymer energy storage system, said system including an electrode and a counter electrode, wherein the electrode comprises a first conducting polymer and the counter electrode comprises a second conducting polymer, wherein the first conducting polymer is doped by at least one or more first redox-active compounds and/or by a polymer and/or a co-polymer of the one or more first redox-active compounds and the second conducting polymer is doped by at least one or more second redox-active compounds and/or by a polymer and/or a co-polymer of the one or more second redox-active compounds, and wherein there is a potential difference between the dopant for the electrode and the dopant for the counter electrode. In one preferred embodiment, the first or the second redox-active compound is 2,2'-azinobis(3-ethyl-benzothiazoline-6-sulfonate) (ABTS). In another preferred embodiment, an exemplary redox-active compound is a polymerizable derivative of ABTS or a polymer or co-polymer of this monomer.

14 Claims, 8 Drawing Sheets

OTHER PUBLICATIONS

Gelo-Pujic et al., "Electrochemical Studies of a Truncated Laccase Produced in Pichia pastoris", Applied and Environmental Microbiology, Dec. 1999, vol. 65, No. 12, pp. 5515-5521.

Gregg et al., "Cross-Linked Redox Gels Containing Glicose Oxidase for Amperometric Biosensor Applications", Anal. Chem. 1990, vol. 62, pp. 258-263.

Groome, N.P. "Superiority of ABTS over Trinder Reagent as Chromogen in Highly Sensitive Peroxidase Assays for Enzyme Linked Immunoadsorbent Assay." J. Clin. Chem. Clin. Biochem., 1980, vol. 18, pp. 345-349.

Palmore et al., "A Methanol/Dioxygen Biofuel Cell That Uses NAD+-dependent Dehydrogenases as Catalysts: Application of an Electro-Enzymatic Method to Regenerate Nicotinamide Adenine Dinucleotide at Low Overpotentials", Journal of Electroanalytical Chemistry 443,1998, pp. 155-161.

Palmore et al., "Bioelectric Power Generation", Trends in Biotechnology, Mar. 2004, vol. 22, No. 3.

Palmore et al., "Electro-enzymatic Reduction of Dioxygen to Water in the Cathode Compartment of a Biofuel Cell", Journal of Electroanalytical Chemistry 464, 1999, pp. 110-117.

Palmore et al., "pH-Dependent Rectification in Redox Polymers: Characterization of Electrode-Confined Siloxane Polymers Containing Naphthoquinone and Benzylviologen Subunits", J. Phys. Chem. B 1997, vol. 101, pp. 2437-2450.

Scheibye et al., "Studies on Organophosphorus Compounds-XXVII Synthesis of Thiono-, Thiolo- and Dithiolactones", Tetrahedron, 1979, vol. 35, pp. 1339-1343.

Sutoris et al., "Benzothiazole compounds XXIV. Synthesis of 2-alkylthio-3-alkylbenzothiazolium salts and their growth-regulating activity", Chem. Papers, 1986, vol. 40, No. 1, pp. 103-114.

Thomas et al. Electroanalysis (2004), 16(7), 547-555.

Manecke et al. Die Makromolekulare Chemie (1973), 172, 1-18.

Shelepin et al. Elektrokhimiya (1977), 13(1), 32-7.

* cited by examiner

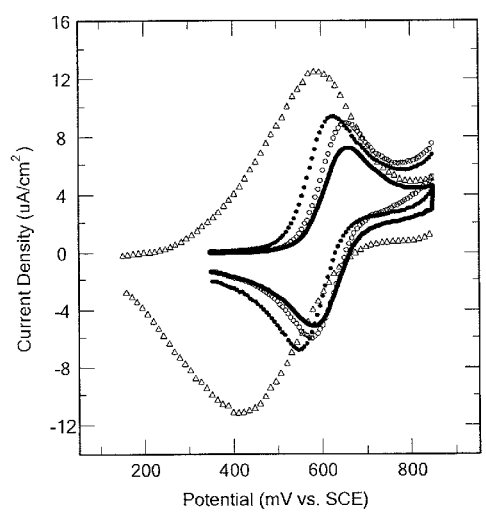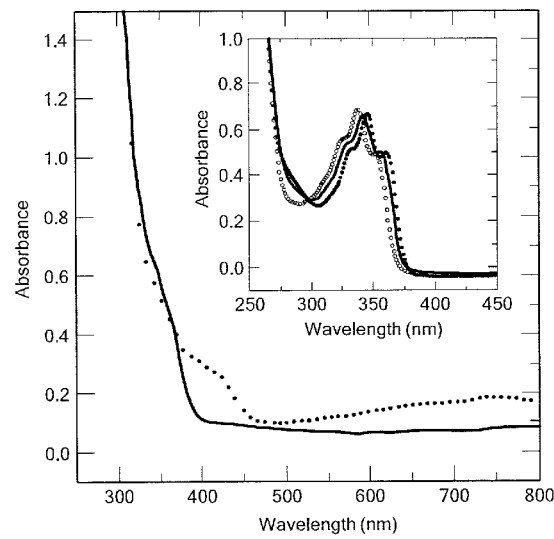
FIG. 2                    FIG. 3

REDOX-ACTIVE POLYMERS AND THEIR APPLICATIONS

CROSS REFERENCE TO RELATED APPLICATIONS

This application is a divisional application of U.S. application Ser. No. 11/512,430, filed Aug. 29, 2006, and claims the priority of U.S. Provisional Application No. 60/712,724, filed Aug. 29, 2005, both of which are hereby incorporated by reference herein.

STATEMENT REGARDING FEDERALLY SPONSORED RESEARCH OR DEVELOPMENT

N/A

BACKGROUND OF THE INVENTION

The molecule 2,2'-azinobis-(3-ethylbenzothiazoline-6-sulfonate) (ABTS) is an important redox-active compound with broad chemical, material and biomedical applications. For example, ABTS and its derivatives have been used as the electrochromic component in smart windows,[1] as a chromogenic substrate in assays for enzymatic activity[2] and as a mediator for electron transfer in bioelectrocatalysis.[3] Interest in the use of ABTS in the bioelectrocatalytic reduction of oxygen to water has increased primarily because its redox potential is near that of oxygen under mildly acidic conditions.[4]

BRIEF SUMMARY OF THE INVENTION

The present invention provides both redox-active monomers and redox-active polymers polymerized therefrom. Preferably, the redox-active monomers of the invention can undergo radical initiated polymerization to form the redox-active polymers. Exemplary redox-active monomers and polymers of the invention can comprise ABTS. The invention also provides methods of synthesis for the redox-active monomers and polymers of the invention. Furthermore, the invention provides devices comprising one or more the redox-active monomers and/or polymers of the invention, which can be used in, for example, broad chemical, material and biomedical applications.

Interest in redox-active polymers stems from their application in electrochromic devices,[5] biofuel cells[6] and biosensors, all of which require a high concentration of electron mediators that are non-leachable.[7] Employment of ABTS and its derivatives for such uses, however, has been limited to solution phase applications prior to the present invention. The development and synthesis of polymerizable derivatives of ABTS would enable the fabrication of composites that possess the redox and chromogenic properties of ABTS, but in a non-leachable, solid-phase form. Use of prior art versions of ABTS in composites leads to leaching of the ABTS molecule from the composite upon exposure to solvents, which results in the loss of the composite's redox and chromogenic properties. In one aspect, the invention is directed to the synthesis of polymerizable derivatives of ABTS as exemplary redox-active monomers of the invention and redox-active polymers formed therefrom. These monomers and polymers can be synthesized according to the invention in a non-leachable, solid-phase form.

In a preferred embodiment, the redox-active monomers of the invention are derivatives of the ABT core of ABTS and are polymerizable through a functional group, e.g., a vinyl functional group, that allows for their radical initiated polymerization into redox-active polymers of ABTS. Monomers of the invention that are derivatives of ABTS are generally referred to as ABTS monomers. Exemplary functional groups can also permit co-polymerization (or even higher order) with other monomers containing similar functional groups that can be polymerized concurrently with the redox-active monomers of the invention. By the choice of other functional groups or functional group substituents, monomers according to the invention can be polymerized into polymers having specific properties, e.g., hydrophobic or hydrophilic properties, and the redox and chromogenic properties of the monomers can be particularly prescribed. The invention also provides co-polymers based on the redox-active monomers according to the invention.

ABTS redox-active monomers according to the invention can have the following structure:

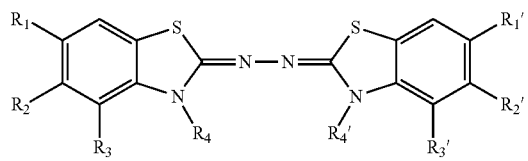

wherein $R_1$ and/or $R_1'$ are selected from the group consisting of MeO, EtO, $COF_3$, $SO_4H$, $SO_3^-$, $SO_3H$, H, $CHNO_4S_2F_3$, $C_5H_4N_2O_6S_2F_6$, $C_{10}H_{10}N_4S_2$, $CH_3$, n-Bu, Cl, $NH_2$, EtN, Br, alkyl, ether, ester, sulfonate, ammonium, carboxylate, phosphonate and any combination thereof;

$R_2$ and/or $R_2'$ are selected from the group consisting of EtO, $SO_3H$, H, $C_{10}H_{10}N_4S_2$, $CH_3$, Cl, $C_6H_{14}N_2S$ and any combination thereof;

$R_3$ and/or $R_3'$ are selected from the group consisting of $CH_3$, Cl, H and any combination thereof; and $R_4$ and/or $R_4'$ are selected from the group consisting of $CH_3$, H, $C_2H_5$, $C_4H_9$, $C_6H_5$, $C_8H_{17}$, $C_2H_5S$, $C_3H_7S$, $C_4H_8Br$, $C_{10}H_{23}N$, $C_{20}H_{21}N_2$, $C_{18}H_{25}N_2$, $C_{21}H_{23}N_2$, $C_{31}H_{29}N_2O_2$, $C_{22}H_{25}N_4$, $C_{20}H_{25}N_2$, $C_3H_7OS$, and any combination thereof.

In general, the above structure (or monomeric unit) can be made to be polymerizable through the presence of a functional group (which can be referred to as a polymerizable function group), preferably, unsaturated, at $R_1$, $R_1'$, $R_2$, $R_2'$, $R_3$, $R_3'$, $R_4$, $R_4'$ or combinations thereof. The position and types of functional groups (including other functional groups not specifically involved in polymerization) attached to a redox-active monomer according to the invention can also influence the properties of the monomer and any polymer polymerized therefrom.

For example, the color of ABTS and its derivatives may be changed by adding different functional groups onto the ABT core. Exemplary functional groups and their corresponding colors include 4,4'-dichloro for black, 6,6'-dibromo for black, 6,6'-dinitro for brown, 4,4'-dimethyl for pink, 5,5'-dimethyl for brown, 6,6'-dimethoxy for black and 6,6'-diethoxy for black. In one aspect, given the chemochromogenic and electrochromogenic properties of ABTS and its derivatives, the above structure can be used as a chromogen.

The solubility of ABTS and its derivatives in water and other polar solvents, e.g., alcohol, can also be increased by the addition of different types of functional groups at particular compound positions. For example, the solubility of the above structure in polar solvents can be increased by adding, e.g., sulfonate, ammonium, carboxylate or phosphonate groups at $R_1$ and $R_1'$. The hydrophobic nature of the monomer, and, thus, its solubility in organic solvents, may be enhanced by the addition of, e.g., alkyl, ether or ester groups at $R_1$ and $R_1'$.

In addition, $R_1$, $R_1'$, $R_2$, $R_2'$, $R_3$, $R_3'$, $R_4'$ and $R_4$ of the above structure may comprise reactive chemical functional groups (e.g., carboxylic acids and their derivatives, amines and their derivatives) that would enable the coupling of biological molecules-of-interest (e.g., DNA, RNA, proteins, carbohydrates, lipids) or other compounds (e.g., pharmaceuticals, redox-active compounds, dyes).

Polymerizable functional groups that can be attached to a redox-active monomer of the invention or any of $R_1$, $R_1'$, $R_2$, $R_2'$, $R_3$, $R_3'$, $R_4$, $R_4'$ or combinations thereof in the above structure include, for example, those in Table 1.

TABLE 1

Unsaturated carbon monomers including, but not limited to:

Olefins, halo-olefins, dienes, acetylenes, styrenes, vinyl compounds and acrylic acids (including acrylics).
Ring monomers including, but not limited to:

Cyclic ethers, lactones, lactams, cyclic amines, cyclic sulfides,
cyclic carbonates, cyclic acid anhydrides, cyclic iminoethers,
amino acid N-carboxy anhydrides, cyclic imides,
phosphorus containing cyclic compounds,
silicon containing cyclic compounds and cyclic olefins.
Bifunctional monomers including, but not limited to:

Phenols, melamines and ureas

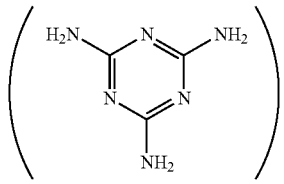

diamines, dicarboxylic acids, hydroxy acids (including oxy carboxylic acid), amino acids (including amino carboxylic acid),
diols, diisocyanates, sulfur containing compounds,
phosphorus containing compounds, aromatic ethers,
dihalides (including dihalogenated compounds), aldehydes,
diketones and carbonates (including carbonic acid derivatives).
Other monomers including, but not limited to, anilines and silane compounds.

The above functional groups are also described by http://polymer.nims.go.jp/guide/guide-eng/term_monomer.html#chap04.

Preferred ABTS monomers according to the invention have the following structure:

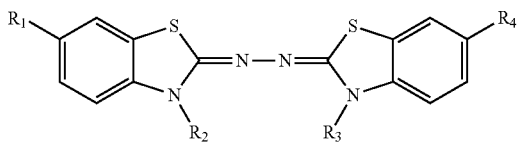

wherein either $R_2$ and/or $R_3$ comprises a carbon monomer functional group as described above and wherein either $R_1$ and/or $R_4$ comprises a hydrophobic functional group such as, for example, hydrogen, alkyl, ether, ester, etc. or a hydrophilic functional group such as, for example, sulfonate, ammonium, carboxylate, phosphonate, etc.

Described herein are the synthesis protocols for two monomer derivatives according to the invention comprising the ABT core of ABTS, namely, N-(3-methyl-3H-benzothiazol-2-ylidene)-N'-[3-(4-vinyl-benzyl)-3H-benzothiazol-2-ylidene]-hydrazine (sABT) and 3-methyl-2-{[3-(4-vinyl-benzyl)-3H-benzothiazol-2-ylidene]-hydrazono}-2,3-dihydro-benzothiazole-6-sulfonic acid (sABTS). These compounds can be polymerized or co-polymerized with other monomers in order to tune the physical properties of the resulting low potential, electrochromic, redox-active polymer.

Monomers and polymers, or co-polymers, according to the invention would find use as the active components of a redox-active, chromogenic composite in applications such as the following: (i) cathode of a biofuel cell; (ii) electron mediator of an air-breathing biocathode; (iii) sensing element of a device to test for the presence of laccase or organisms that produce laccase (an enzyme whose presence is indicative of, e.g., contaminated wine or wine products); (iv) sensing element of a device to measure the presence of oxygen or pH of a solution; and (v) display technologies, such as those using suspended particle devices (SPDs). For example, any present application of a commercial, conventional form of ABTS (e.g., enzyme assays, biosensors, electrochromic devices) may be improved by using, instead, a polymer of ABTS according to the invention (polyABTS), preferably, in a non-leachable, solid-phase form, which has been synthesized from a polymerizable, low potential ABTS monomer according to the invention (i.e., a monomer having a halfwave potential, $E_{1/2}$, >500 millivolts vs. a saturated calomel electrode).

Thus, in another aspect, the invention is directed to a redox-active, conducting polymer energy storage system, e.g., a battery or a capacitor, comprising any conducting polymer as the basis for an electrode or counter electrode, e.g., the anode or cathode, respectively, wherein, for example, the conducting polymer of the electrode is doped with a first redox-active compound, wherein, for example, the conducting polymer of the counter electrode is doped with a second redox-active compound and wherein there is a potential difference between the dopant for the electrode and the dopant for the counter electrode.

Exemplary conducting polymers include organic polyheterocyclics, such as polypyrrole, polythiophene, polyaniline and their derivatives. One advantage of using electrically conducting polymers is that such materials can be modified with charged "dopants" tailored to specific applications. For example, positively or negatively charged ions can be used as a dopant for conducting polymers. In one aspect, the monomers for such polymers can be electropolymerized anodically to generate polarons and subsequently bipolarons, with, for example, one positive charge for every three to four monomeric units. For example, in the case of pyrrole, to compensate for the positive charge that develops along the polymeric backbone, a counter anion dopant becomes electrostatically bound to the polymer during electrodeposition, such as represented by $[(C_4H_6N)^+_{3 \, or \, 4}(X^-)]_n$. If the counter anion is large or polyanionic, it can actually become physically entangled and immobilized within the conducting polymer or its associated "matrix."

By immobilizing monomers and/or polymers according to the invention, such as, for example, ABTS monomers and/or polymers polymerized therefrom, in a conductive polymer matrix disposed on an electrode surface, one can significantly increase current flow and the energy that can be stored within the polymer matrix. Polymers according to the invention are not just charged but are also fully redox-active. Redox-active polymers of the invention can be used in conjunction with redox-active enzymes. For example, low potential redox-active polymers can be useful at voltages near that of oxygen, making such polymers ideal for use with redox-active enzymes. Still, other redox-active polymers of the invention can be used at higher potentials.

In another aspect, the invention is directed to a handheld biosensor electronic device that uses a polymer according to the invention, such as polyABTS, as the active material for detecting, e.g., the level of laccase in a sample. Such detections using a biosensor electronic device of the invention are preferably based on a biochemical reaction between polyABTS and laccase in the presence of oxygen. For example, detection can relate to the electrochemical reduction of the polyABTS radical. More broadly, the presence of any enzyme that could use any redox-active polymer according to the invention as a substrate or any chemical that would oxidize a polymer according to the invention to its radical form, either in solution or in the air, could be detected using a biosensor electronic device of the invention.

In another aspect, the invention is directed to an air-diffusion bioelectrocatalytic cathode or cathode system operable in humidified air or humidified oxygen. In a preferred embodiment, a cathode system according to the invention comprises a polymer composite featuring polypyrrole embedded with laccase and polyABTS as the bioelectrocatalytic material of the system. Broadly speaking, any redox-active monomer or polymer according to the invention can be used as the bioelectrocatalytic material of a cathode system as described herein. In general, polymer based systems would usually be preferable over monomer based systems as leakage of a monomer or its associated mediator would reduce the lifetime of the cathode. Moreover, any conducting polymer such as, for example, polyaniline and its derivatives can fulfill the role described herein for polypyrrole.

BRIEF DESCRIPTION OF THE DRAWINGS

Other features and advantages of the invention will be apparent from the following description of the preferred embodiments thereof and from the claims, taken in conjunction with the accompanying drawings, in which:

FIG. 2 shows cyclic voltammograms (CVs) of commercially available ABTS and of ABTS monomers and poly ABTS according to the invention. Commercially available ABTS (closed circles), sABT monomer (open circles), sABTS monomer (solid line) and film of polyABTS (open triangles);

FIG. 3 shows a spectroelectrochemistry evaluation of a polyABTS/ITO electrode according to the invention immersed in 0.2 M KCl. The spectra correspond to before (solid line) and after (dotted line) application of potential. Inset: UV-Vis spectra of sABT (open circles), sABTS (solid line) and ABTS (closed circles) in DMSO;

FIG. 10b shows the corresponding potential versus power density plots for the fuel cells of FIG. 10a.

DESCRIPTION OF THE PREFERRED EMBODIMENT OF THE INVENTION

Figure 1:
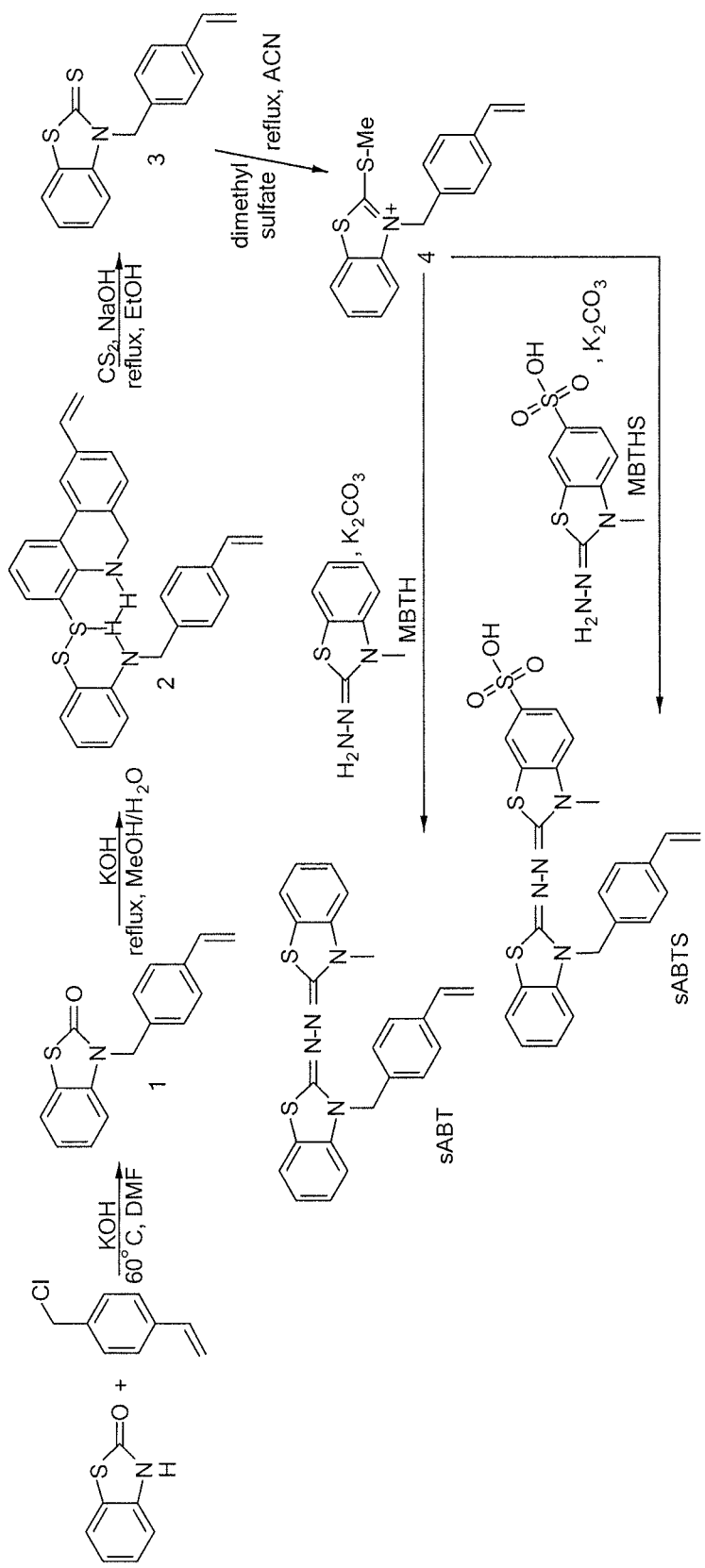
FIG. 1 shows exemplary synthetic routes to two ABTS monomers of the invention.

In one aspect, the invention provides redox-active monomers of ABTS and its derivatives capable of polymerizing into a redox-active polymer. Preferably, monomers of the invention include N-(3-Methyl-3H-benzothiazol-2-ylidene)-N'-[3-(4-vinyl-benzyl)-3H-benzothiazol-2-ylidene]-hydrazine (sABT) and 3-Methyl-2-{[3-(4-vinyls-benzyl)-3H-benzothiazol-2-ylidene]-hydrazonol}-2,3-dihydro-benzothiazole-6-sulfonic acid (sABTS). These monomers are also referred to as polymerizable derivatives of ABTS.

The examples herein are provided to illustrate advantages of the invention, including those that have not been previously described, and to further assist a person of ordinary skill in the art with using the monomers, polymers, co-polymers and devices of the invention. The examples can include or incorporate any of the variations or inventive embodiments as described herein. The embodiments that are described herein also can each include or incorporate the variations of any or all other embodiments of the invention. The following examples are not intended in any way to otherwise limit or otherwise narrow the scope of the disclosure as provided herein.

Exemplary Approaches to Synthesis and Products Therefrom

Example of Synthesis of sABT, sABTS and polyABTS of the Invention as Well as Characterization of the Monomers and Polymers of the Invention:

In another aspect, the invention provides a synthetic route for synthesizing polymerizable derivatives of ABTS. An exemplary synthetic route of the invention is shown by the five step route of FIG. 1. The first four steps result in a common intermediate 4 that can be used to manipulate the solubility of the monomer end products and the hydrophobicity or hydrophilicity of their corresponding polymers. Reaction of 4 with, for example, 3-methyl-benzothiazolinone-(2)-hydrazone (METH) results in a hydrophobic product (sABT) whereas reaction of 4 with 3-methyl-6-(M sulfonate)-benzothiazolinone-(2)-hydrazone (MBTHS) results in the hydrophilic product (sABTS). Both products can yield redox active polymers that are hydrophobic, hydrophilic, or amphiphilic depending on the ratio of sABT to sABTS.

The first step in the synthetic sequence reacts 2-benzothiazolinone with 4-vinylbenzyl chloride under basic conditions using methods similar to that described by J. D'Amico et al. to yield the N-styryl substituted benzothiazolinone 1 as a white crystalline solid in a yield range from, for example, 91 to 93%.[8] Optimal reactions conditions were found at 60° C. for 1 hour in a dimethylformamide (DMF) solution containing 9 molar (M) potassium hydroxide (KOH). Higher temperatures or longer reaction times led to more side products and a lower yield.

Hydrolysis of benzothiazolinone[9] and thiazolinone[10] can be accomplished using different approaches. The hydrolysis of 1 was accomplished by purging a mixture of methanol and water containing a high concentration of KOH with nitrogen to give an aminothiol product. Chromatographic isolation of the aminothiol product from several side products, however, proved difficult. Therefore, the hydrolysis reaction was performed in the presence of oxygen to give the corresponding disulfide 2 in, for example, 53-55% yield. The disulfide, which is a yellow crystalline solid, is easier to isolate because its retardation (Rf) value is higher than 1 or the aminothiol product obtained in the absence of oxygen. Both the aminothiol product or 2 will react with carbon disulfide when refluxed in a mixture of ethanol and sodium hydroxide (NaOH) to give 3 as a white crystalline solid.[11] Choosing the disulfide product instead of the aminothiol product simplified the isolation process to give 3 in, for example, 82-84% yield. Diethyl ether was the solvent of choice for extraction of the 3 from the reaction mixture.

Benzothiazolinone or thiazolinone are known to react with the corresponding benzothiazolinethione or thiazolinethione via phosphorus pentasulfide thiation reaction or Lawesson's reagents without an intermediate hydrolysis step.[12] Compound 1, however, does not react with those reagents using either method. Moreover, the Rf values of both benzothiazolinone and benzothiazolinethione are identical, making it difficult to isolate the product from the starting material using liquid chromatography.

Sulfonation of MBTH, available from Aldrich Chemical Co., Milwaukee, Wis., yields MBTHS according to U.S. Pat. No. 5,989,845, hereby incorporated by reference herein.[13] Both MBTH and MBTHS react with 4 to give the respective exemplary monomers of the invention, sABT and sABTS (FIG. 1).

Methylation of 3 was achieved with dimethyl sulfate[14] as all attempts to methylate 3 with methyl iodide were unsuccessful. The derivatives of hydrazone, MBTH and MBTHS, were reacted with the methylated product 4 to obtain sABT (50%) and sABTS (63%) respectively, without further isolation.[15] Both sABT and sABTS are white powders. It should be noted that the sodium salt of sABTS is difficult to dissolve in any solvent. Therefore, this product was prepared for chromatographic isolation and polymerization by washing with 1 M hydrochloric acid (HCl). Subsequent to chromatographic isolation, the purified product was neutralized with an organic base (e.g., tetrabutylammonium hydroxide) to obtain a product that exhibits good solubility in both organic solvents and water for subsequent polymerization.

The tetrabutylammonium salt of sABTS was polymerized in ethanol for 1 day at 65° C. in the absence of oxygen using 2,2'-azo-bis(isobutyronitrile) (AIBN) (50:1) as the radical initiator. Subsequently, a solution containing polyABTS of the invention (~28 micromole, μmol, of the sABTS monomer, as calculated from the absorption spectrum using the extinction coefficient of sABTS) was dried on the surface of a rotating electrode (with a diameter of 4 millimeters, m) for cyclic voltammetry and bioelectrocatalysis experiments. A second solution containing polyABTS of the invention (~56 μmol of the sABTS monomer) was dried on the surface of an indium-tin oxide (ITO) electrode (with a surface area of 1 centimeters squared, $cm^2$) for electrochromic experiments.

Values for $E_{1/2}$ of sABT, sABTS (both of the invention) and ABTS (commercially available) were obtained from the CVs shown in FIG. 2. The concentration of all three monomers was 2.5 mM, the electrolyte was 0.1 M tetrabutylammonium hexafluoroborate in DMSO. Also shown is the CV of an electrode coated with polyABTS immersed in an aqueous solution of 0.2 M KCl. The scan rate was 10 $mVs^{-1}$ for all CVs. All potentials are reported versus SCE. For sABT, $E_{1/2}$ is 613 millivolts (mV) when dissolved in a dimethyl sulfoxide (DMSO) solution containing in 0.1 M tetrabutylammonium hexafluoroborate. Under identical conditions, $E_{1/2}$ of sABTS is 620 mV. The peak to peak separation of 76 mV for sABT and 78 mV for sABTS indicate-reversible electrochemical reactions.[16] The diffusion coefficients of sABT and sABTS are $1.21 \times 10^{-6}$ $cm^2 s^{-1}$ and $8.1 \times 10^{-7}$ $cm^2 s^{-1}$, respectively. For comparison, the value for $E_{1/2}$ of ABTS (commercially available) is 587 mV in DMSO and 440 mV in sodium acetate buffer (pH 4).[4] The diffusion coefficient of ABTS in DMSO is $1.39 \times 10^{-6}$ $cm^2 s^{-1}$ and in sodium acetate buffer (pH 4), the value is $3.22 \times 10^{-6}$ $cm^2 s^{-1}$. Also shown in FIG. 2 is the cyclic voltammogram of a film of polyABTS prepared by drying a drop of a 25 μmol solution of polyABTS on a glassy carbon electrode. $E_{1/2}$ of the polyABTS of the invention film is 500 mV in 0.2 M potassium chloride (KCl) solution, which is 120 mV negative to that of its monomer in DMSO. The peak to peak separation is 168 mV indicating poor self-exchange kinetics in a pure film of polyABTS.[17]

The method of Nicholson was used to determine the rate constant ($k_h$) for heterogeneous electron transfer between a glassy-carbon electrode and the polymerizable monomers of the invention.[18] For sABT, $k_h = 1.47 \times 10^{-3}$ $cms^{-1}$ and for sABTS, $k_h = 2.18 \times 10^{-3}$ $cms^{-1}$. For comparison, $k_h = 2.02 \times 10^{-3}$ $cms^{-1}$ for ABTS in 0.1 M tetrabutylammonium hexafluoroborate DMSO solution, or $4.54 \times 10^{-3}$ $cms^{-1}$ in sodium acetate buffer (pH 4).

The compound, N,N'-Bis-(3-methyl-3H-benzothiazole-2-ylidene)-hydrazine (mABT), has been used as the electroactive component in an electrochromic device.[1] Both mABT and sABTS have similar chemical structures, however, sABTS possesses an N-styryl group to render the monomer polymerizable and a sulfonate group to make it and its corresponding polymer water soluble. Shown in FIG. 3 are the ultraviolet-visible (UV-Vis) spectra of an ITO electrode coated with a film of polyABTS of the invention (~56 μmol sABTS) while immersed in an aqueous solution of 0.2 M KCl. Spectra correspond to the film before (solid line) and after (dotted line) poising the electrode at 600 mV for 10 seconds. Application of an oxidizing potential converts polyABTS (transparent in the visible region of the absorption spectrum) to polyABTS$^{.+}$ of the invention, which is blue-green in color.

Shown in the inset of FIG. 3 are the UV-Vis spectra of 20 micromolar (μm) solutions of sABT, sABTS and ABTS in DMSO. Both sABT and sABTS have absorption peaks at ~255 nanometers (nm), which corresponds to electronic transitions in the styrene ring, and at ~340 nm, which corresponds to electronic transitions in the conjugated system that include the four nitrogen atoms. This absorption band is observed in the absorption spectrum of commercial ABTS and therefore confirms the presence of the same chromophore in both the sABT and sABTS monomers of the invention. The extinction coefficient of the reduced forms of sABT and sABTS dissolved in DMSO were determined to be $3.06 \times 10^4$ $M^{-1} cm^{-1}$ at 338 nm and $2.96 \times 10^4$ $M^{-1} cm^{-1}$ at 341 nm, respectively. The extinction coefficient of ABTS at 340 nm in 0.2 M sodium acetate buffer (pH 4) has been previously reported to be $3.45 \times 10^4$ $M^{-1} cm^{-1}$.[4] Similar to polyABTS, a color change is observed upon electrochemical oxidation of solutions containing the monomers sABT, sABTS, and ABTS (data not shown).

Figure 4:
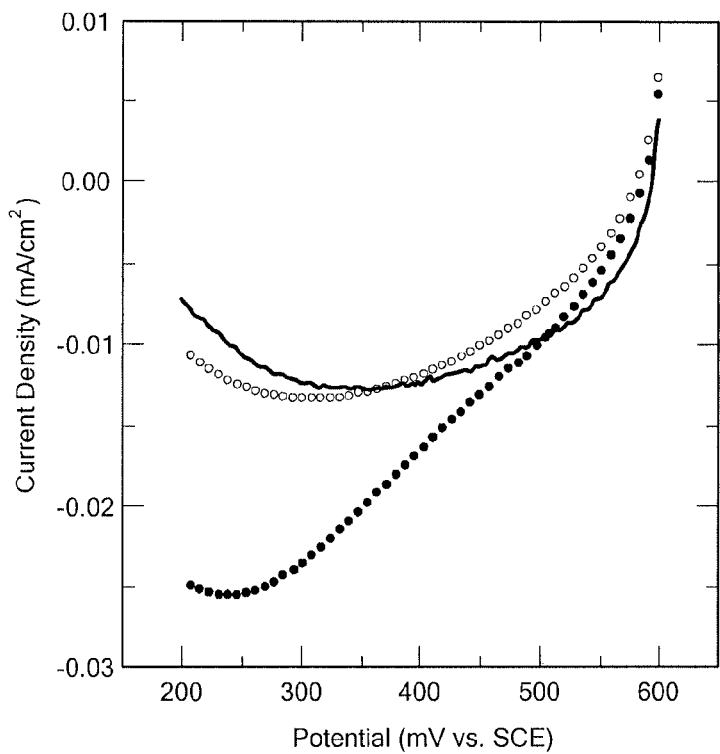
FIG. 4 shows linear sweep voltammograms (LSVs) of a polyABTS/glassy carbon electrode according to the invention. The electrode was immersed in 0.2 M KCl purged with either nitrogen or oxygen (solid line); or immersed in 0.2 M sodium acetate buffer (pH 4) containing 1 mg/ml laccase and purged with nitrogen (open circles) or oxygen (closed circles). The scan rate for all LSVs was 1 mV s$^{-1}$.

PolyABTS of the invention is also used to facilitate electron transport between the cathode of a biofuel cell and the active site of laccase in order to generate electrical power.[4] Shown in FIG. 4 are LSVs that demonstrate polyABTS of the invention participates in the bioelectrocatalytic reduction of oxygen to water. The LSVs were collected under four different conditions: a polyABTS-coated electrode was immersed in 0.2 M KCl that was purged with either 1) nitrogen or 2) oxygen; or the polyABTS-coated electrode was immersed in 0.2 M sodium acetate buffer (pH 4) containing 1 milligram per milliliter (mg/ml) laccase that was purged with either 3) nitrogen or 4) oxygen. In the absence of oxygen or laccase or both, reductive current is not observed. This result indicates that polyABTS itself does not catalyze the electrochemical reduction of oxygen. When dioxygen and laccase are both present, however, reductive current is observed. It should be noted that reductive current is not observed at an uncoated electrode in the presence of both dioxygen and laccase. These results confirm that polyABTS of the invention facilitates the transport of electrons from the working electrode to the active site of laccase in solution and also confirm that polyABTS can be used in electrochemical sensors such as, for example, the handheld biosensor electronic device of the invention that detect dioxygen or laccase. In addition to a biosensor electronic device, the invention also provides other electrochemical sensors based on the results of FIG. 4 that comprise polyABTS according to the invention.

Examples of Co-Polymers According to the Invention:

The hydrophobic/hydrophilic characteristics of polyABTS of the invention can be varied with the choice of monomer functional groups and/or by co-polymerization with different monomers.

Two versions of polyABTS co-polymer of the invention have been synthesized as described herein.

(1) Synthesis of a poly-ABTS-co-acrylate sodium salt (pAA) having the following structure:

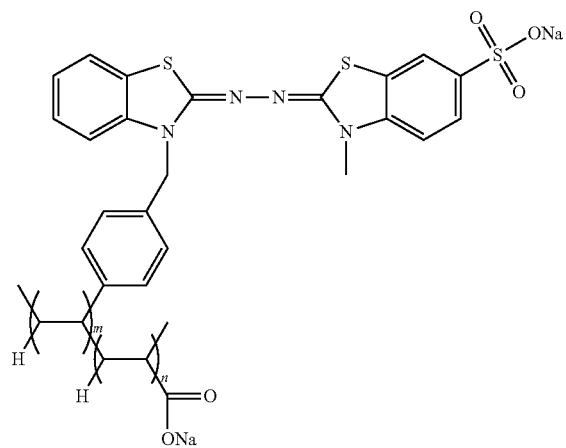

wherein m and n are integers and can be the same or different.

A polymerizable derivative of ABTS of the invention was synthesized according to the method described above but modified as follows:

0.2 millimoles (mmol) of ABTS monomer, 3-methyl-2-{[3-(4-vinyl-benzyl)-3H-benzothiazol-2-ylidene]-hydrazono}-2,3-dihydro-benzothiazole-6-sulfonatetetrabutyl-ammonium, and 0.2 mmol acrylic acid were dissolved in 0.5 ml ethanol with 4 µmol AIBN as an initiator. After purging with nitrogen for 30 minutes in iced water, the reaction was heated and stirred at 65° C. for 1 day. After cooling the reaction, a cation exchange was performed on the polymer product, converting it into sodium salt. The product was dialyzed in a membrane with a 3,000 molecule weight cut-off.

(2) Synthesis of a poly-ABTS-co-vinyl imidazole sodium salt (pAVI) having the following structure:

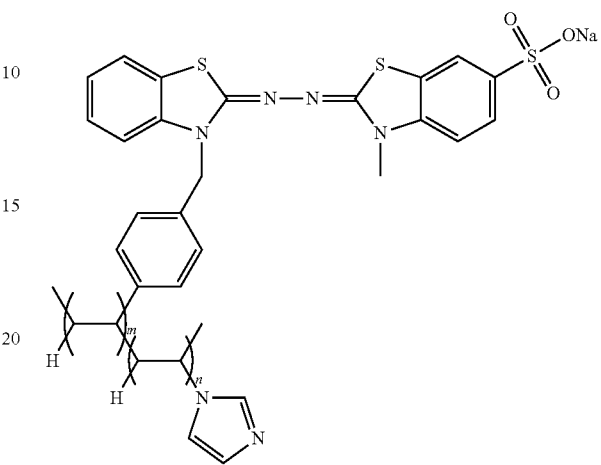

wherein m and n are integers and can be the same or different.

A polymerizable derivative of ABTS of the invention was synthesized according to the method described above, but modified as follows:

0.2 mmol of ABTS monomer, 3-methyl-2-{[3-(4-vinyl-benzyl)-3H-benzothiazol-2-ylidene]-hydrazono}-2,3-dihydro-benzothiazole-6-sulfonatetetrabutyl-ammonium, and 0.2 mmol 1-vinyl imidazole were dissolved in 0.5 ml ethanol with 4 µmol AIBN as an initiator. After purging with nitrogen for 30 minutes in iced water, the reaction was heated and stirred at 65° C. for 1 day. After cooling the reaction, a cation exchange was performed on the polymer product, converting it into sodium salt. The product was dialyzed in a membrane with a 3,000 molecule weight cut-off.

Exemplary Devices and Aspects of the Invention

Redox-Active, Conducting Polymer Energy Storage System of the Invention:

An exemplary energy storage system of the invention comprising two conducting polymer electrodes incorporated with different electroactive dopants was developed. Polypyrrole (pPy) was used as the conducting polymer with indigo carmine (IC) (to form pPy[IC]) and 2,2'-azinobis(3-ethylbenzothiazoline-6-sulfonate) (ABTS) (to form pPy[ABTS]) as dopants. This example describes a redox-active conducting polymer battery, pPy[IC]|pPy[ABTS], in which the redox activity of the system is based on the faradaic reactions of the dopants. In contrast, conventional batteries[19,20] or electrochemical capacitors[21] use the redox properties of or doping/dedoping of the conducting polymers for energy storage.

An ABTS dopant of a conductive polymer in the energy storage system of the invention can be an ABTS monomer or polymer of the invention as well as a conventional form of ABTS. The polymeric form is preferred as it will be less likely to leach away from the conducting polymer matrix over time.

The pPy[IC]|pPy[ABTS] showed dramatically enhanced performance at high power density (energy density, ED, equal to 8 watt-hours per kilogram, Wh kg$^{-1}$, at a power density, PD, of $10^2$ to $10^4$ watts per kilogram, W kg$^{-1}$). The characteristic performance comes from the combination of merits of batteries and electric double layer capacitors (EDLC). The principle of energy storage is based on faradaic processes of redox dopants (battery-like), but the electrochemical reactions are very surface-confined without diffusion of the electroactive materials. Instead, the counter-ions in electrolytes neutralize the charge of electrodes (EDLC-like). The porous structure of the conducting polymer enables the access of counter ions to the dopants giving high surface area. Also, the conductively polymeric matrix provides electrically conducting environments leading to enhanced electron transfer between base electrodes and electroactive dopants.

Dopants IC and ABTS can have the following structures:

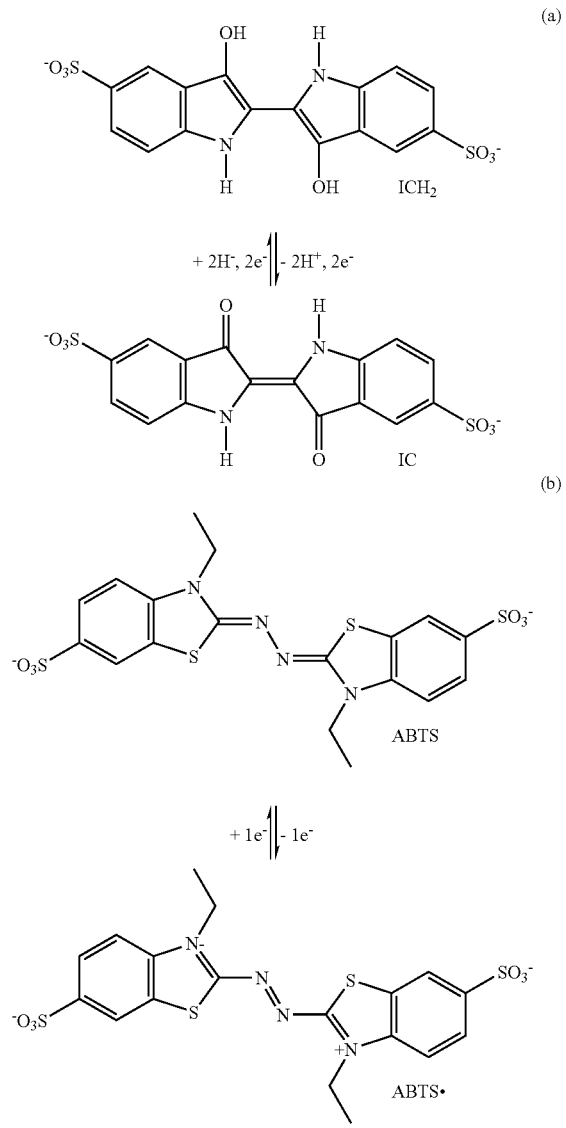

The cationic charge that develops in polypyrrole during the electropolymerization of pyrrole requires an influx of anions from the electrolyte to maintain charge neutrality.[22] The above structures of each dopant (IC or ABTS) include two sulfonate substituents, which confer anionic character to these compounds in both their oxidized and reduced forms. Both IC and ABTS exhibit reversible redox chemistry at 52 mV and 570 mV (all potential is reported versus silver/silver-chloride, Ag/AgCl, in this work), respectively, in a supporting electrolyte of 0.2 M HCl, pH 1. Because of these two characteristics, anionic character and reversible redox chemistry, both compounds are attractive for their use as anionic dopants in the conductive form of polypyrrole. Dopants incorporated in the conducting polymer on both positive and negative electrodes are required to be anionic and to show completely reversible and fast faradaic reactions. In addition, the faradaic reaction of dopants should not affect the properties of the conducting polymer matrix into which the dopants are incorporated. The larger the potential difference between the dopants for the positive and the negative electrode the higher the energy density in the battery. Consequently, it is better to use dopants that have a more positive redox potential for the positive electrodes and a more negative redox potential for the negative electrodes. The conducting polymer matrix and electrolytes should be chosen by considering the redox potential of the dopants.

Doped polypyrrole was electrodeposited on a glassy carbon in an aqueous solution of 200 mM pyrrole and 25 mM dopant (either IC or ABTS) by sweeping the potential between 0 and 650 mV for 40 cycles at 100 mV s$^{-1}$. Increases in current during electrodeposition were observed for both dopants as the number of cycles increased, indicative of the formation of conductive films and incorporation of dopants into the conducting polymer. Dark blue films were deposited. Based on elemental analysis, the ratio of pyrrole subunits to IC or ABTS dopants in polypyrrole was estimated at 10:1, giving one positive charge for every five subunits of pyrrole.

CVs of both pPy[IC] and pPy[ABTS] showed reversible redox behavior at the same potentials as those of IC and ABTS in solution respectively. Thus, incorporation of IC or ABTS into polypyrrole does not affect their average redox potential. Accordingly, a rechargeable battery of the invention can be fabricated with pPy[IC] and pPy[ABTS] because these materials possess properties that are important to battery technology. First, both pPy[IC] and pPy[ABTS] exhibit reversible redox behavior at different potentials. Second, the concentrations of IC and ABTS in pPy[IC] and pPy[ABTS] are high, allowing for high faradaic currents. Third, concentration overpotentials associated with a mass-transfer limited reaction is circumvented by confinement of the redox-active molecules to the surface of the electrode. Thus, the rate of electron transfer between the electrode and IC in pPy[IC] or ABTS in pPy[ABTS] is fast compared to IC or ABTS in solution. The first property is required for a rechargeable battery and the second property affords a battery with high energy density. The third property guarantees a battery with good performance characteristics at fast discharge rates.

Figure 5:
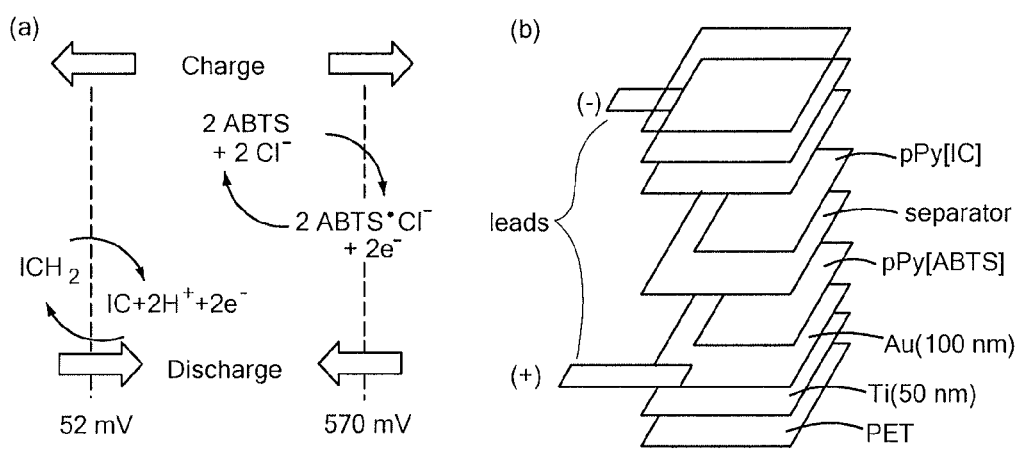
FIG. 5 shows an energy storage system of the invention (a battery) based on a pPy[IC] anode and pPy[ABTS] cathode.

Shown in FIG. 5a is a schematic diagram of the principle of a battery of the invention using pPy[IC] as the anode and pPy[ABTS] as the cathode. A schematic diagram of such a battery of the invention is given in FIG. 5b. During charging, the IC in pPy[IC] is reduced at 52 mV with protons from the electrolyte at the anode. Simultaneously, the ABTS in pPy[ABTS] is oxidized to the radical cation at 570 mV with chloride anions from the electrolyte maintaining charge neutrality at the cathode. During discharge the reverse reactions proceed at both electrodes respectively.

Based on the values of each electrode (Table 2), the theoretical capacity of a battery consisting of polypyrrole doped with IC and ABTS is estimated at 54 coulombs per gram (C g$^{-1}$) or 15 milliampere hours per gram (mAh g$^{-1}$). The theoretical capacity of this battery is one-seventh the capacity of a lithium ion battery composed of a lithiated graphite (LiC$_6$) anode and a LiMn$_2$O$_4$ cathode (~100 mAh g$^{-1}$).

TABLE 2

Electrochemical properties of redox units dissolved in solution (soln)
and doped into films of polypyrrole with micro-coulombs as µC.

|  | IC | | ABTS | |
| --- | --- | --- | --- | --- |
|  | soln | pPy[IC] | soln | pPy[ABTS] |
| $k°$ (cm sec$^{-1}$) × 10$^3$ | 7.9 | 26 | 15 | 9.1 |
| Q (µC) | 2.2 | 85 | 1.6 | 84 |
| Conc. (mM) | $C_{max} < 50$ | $C_{film} = 1500$ | $C_{max} < 100$ | $C_{film} = 2900$ |
| Capacity (C g$^{-1}$) | — | 170 | — | 80 |

Exemplary Biosensor of the Invention:

Oxidases such as laccase are secreted by the grey mold *Botrytis cinerea*. Contamination of grapes with *Botrytis cinerea* is an economical nightmare for more than one million winemakers around the world because laccase catalyzes the oxidation of antioxidants in wine such as polyphenol. Polyphenols contribute to the color, smell and taste of red wines and therefore, are the most important components in red wine. Moreover, it is believed that polyphenols in red wine reduce the risk of heart disease, stroke and cancer, with possible beneficial effects for muscular degeneration and Alzheimer's disease. When polyphenols are oxidized by laccase, however, they lose their antioxidant properties. In addition, when laccase is present, the color of wine turns from red to brown, which is accompanied by an unpleasant smell and taste. Consequently, winemakers seek to detect the presence of laccase before they begin the fermentation process. Currently, winemakers send samples of their wine to outside laboratories to test for the level of laccase in the wine. Typical costs are $50 per sample and testing takes at least two days. Another aspect of the invention is a handheld electronic device that uses a polymer according to the invention, such as polyABTS, as the active material for detecting the level of laccase in a sample. This detection is based on a biochemical reaction between polyABTS and laccase in the presence of oxygen, which can be detected electrochemically by the reduction of the polyABTS radical. The level of laccase can be measured in 10 minutes, and, thus, this device would be useful, e.g., to winemakers who wish to make in-house measurements of the level of contamination of all materials used at any point in the winemaking process.

An exemplary device according to the invention was prepared as described by the following:

An ABTS monomer {3-methyl-2-{([3-(4-vinyl-benzyl)-3H-benzothiazol-2-ylidene]-hydrazono}-2,3-dihydro-benzothiazole-6-sulfonate tetrabutyl-ammonium} (0.4 mmol) was dissolved in 1 ml ethanol/water (1 to 1 ratio) with 0.02 mmol of the radical initiator AIBN. After purging the reaction mixture with nitrogen for 30 minutes while jacketed with iced water, the reaction was heated and stirred at 65° C. for 0.1 day. After cooling the reaction, the polymer product (polyABTS of the invention) was converted to a lithium salt via cation exchange. The product subsequently was dialyzed in a membrane with a molecular weight cut-off of 3,000.

After depositing a solution of polyABTS of the invention onto an ITO electrode, the electrode was immersed in a solution of red wine with varying concentrations of laccase. A potential was applied to the electrode (100 mV versus SCE) and after 10 minutes, the value of current was measured.

Figure 6:
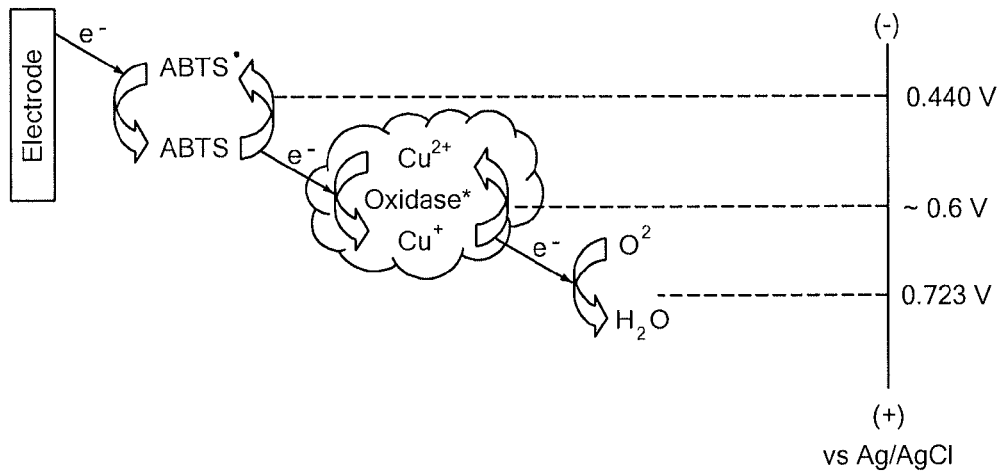
FIG. 6 illustrates that current measured at an electrode coated with polyABTS of the invention is due to laccase catalyzed oxidation of ABTS to ABTS. with concurrent reduction of oxygen to water.

Shown in FIG. 6 is a schematic that illustrates the operating principle of the exemplary device of the invention. An electrode is coated with polyABTS. This material functions as a substrate to laccase. When laccase and oxygen are present, laccase will catalyze the oxidation of the ABTS subunits in polyABTS to their radical form (ABTS.). Oxidation of four equivalents of ABTS to ABTS. results in the reduction of all four copper (Cu) (II) ions in the active site of laccase to Cu (I) ions where upon binding, one equivalent of dioxygen is reduced to two equivalents of water. Thus, the active site of laccase is, returned to its resting state (i.e., 4×Cu (II) ions). For bioelectrocatalysis to continue, the ABTS. subunits in polyABTS must be reduced at the electrode to give ABTS. The reduction of ABTS. to ABTS by the electrode results in a measured current, which can be correlated to the concentration of laccase in solution. For example, if the concentration of laccase in solution is increased, the amount of ABTS oxidized to ABTS. increases in a given period of time, and, therefore, the amount of current required to reduce the greater quantity of ABTS. back to ABTS increases. The thermodynamic driving force associated with the bioelectrocatalytic reaction described herein is shown on the right in FIG. 6.

As described by the following, the response of a polyABTS/ITO electrode to changes in the concentration of laccase in red wine was tested.

Figure 7:
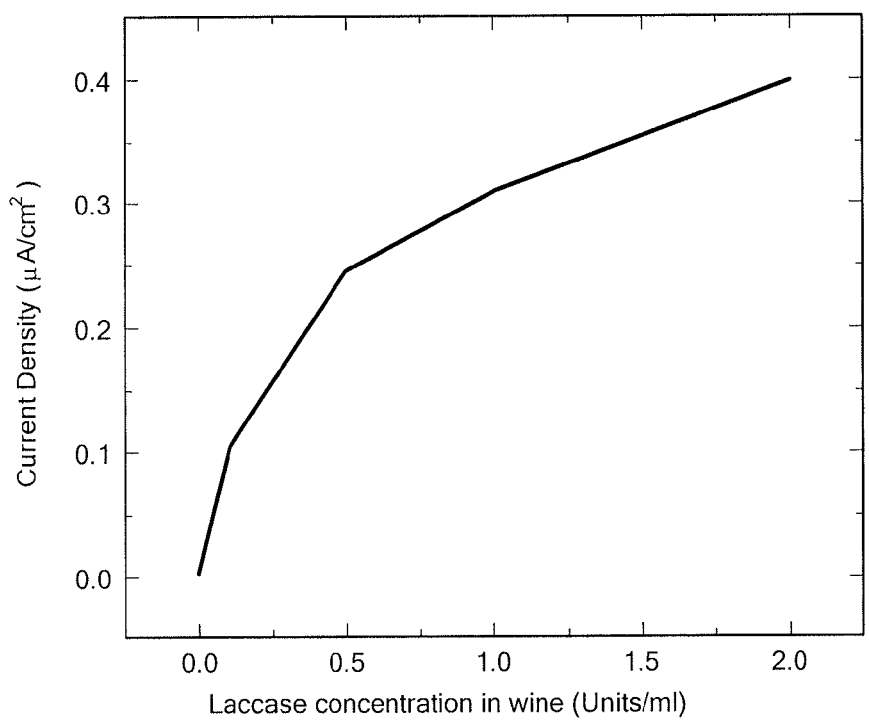
FIG. 7 shows the concentration of laccase in a sample of red wine as a function of current density.

An aqueous solution of polyABTS is deposited onto an ITO electrode and allowed to dry. After drying, the polyABTS/ITO electrode is immersed in red wine (pinot noir) containing laccase (from *Trametes versicolor*) at several different concentrations (0, 0.1, 0.5, 1, 2 units/ml). The polyABTS/ITO electrode and platinum gauze are connected to a potentiostat as working electrode and counter electrodes, respectively. A SCE is used as the reference electrode. A potential of 100 mV is applied to the polyABTS/ITO electrode and after 10 minutes, the current is recorded. The results are shown in FIG. 7.

Other exemplary uses for a biosensor according to the invention include, but are not limited to, incorporation in those assays and devices indicated in Table 3. Broadly speaking, the presence of any enzyme that could use ABTS as a substrate or any chemical that would oxidize ABTS to its radical form, either in solution or in the air, could be detected using a device of the invention. The above example of a handheld biosensor electronic device is merely one type of device contemplated by the present invention. A biosensor of the invention can also be used to detect the presence of such exemplary enzymes as bilirubin oxidase, ceruloplasmin, ascorbate oxidase or copper oxidases as well as any enzyme capable of reducing oxygen to water or to peroxide.

TABLE 3

Prior art assays and devices providing exemplary use
for devices and methods according to the invention 1. Potentiometric determination of glucose in blood samples. (Borrajero, M., et al., Rassegna Chimica (1991), 43(2), 61-3)
2. HRP/[Zn—Cr-ABTS] redox clay-based biosensor: design and optimization for cyanide detection. (Shan, Dan, et al., Biosensors & Bioelectronics (2004), 20(2), 390-396)
3. Six spectroscopic methods for detection of oxidants in urine: Implication in differentiation of normal and adulterated urine. (Paul, Buddha D., Journal of Analytical Toxicology (2004), 28(7), 599-608)

TABLE 3-continued

Prior art assays and devices providing exemplary use
for devices and methods according to the invention 4. Application of the 2,2'-Azinobis(3-ethylbenzothiazoline-6-sulfonic acid) Radical Cation Assay to a Flow Injection System for the Evaluation of Antioxidant Activity of Some Pure Compounds and Beverages. (Pellegrini, Nicoletta, et al., Journal of Agricultural and Food Chemistry (2003), 51(1), 260-264)

5. Pseudoperoxidase activity of myoglobin: kinetics and mechanism of the peroxidase cycle of myoglobin with H2O2 and 2,2-azino-bis(3-ethylbenzthiazoline-6-sulfonate) as substrates. (Carlsen, Charlotte, et al., Journal of Agricultural and Food Chemistry (2003), 51(19), 5815-5823)

6. Application of a New Color Detection Based Method for the Fast Parallel Screening of DeNOx Catalysts. (Busch, Oliver, et al., Journal of the American Chemical Society (2002), 124(45))

7. New methods for the determination of chlorine species in drinking water. (Nowack, Bernd, et al., Proceedings - Water Quality Technology Conference (1999), 1145-1161)

8. Enzymatic Determination of Methanol with Alcohol Oxidase, Peroxidase, and the Chromogen 2,2'-Azinobis(3-ethylbenzthiazoline-6-sulfonic acid) and Its Application to the Determination of the Methyl Ester Content of Pectins. (Mangos, Thomas, et al., Journal of Agricultural and Food Chemistry (1996), 44(10))

9. Evaluation of the enzymic assay of blood ethanol with 2,2'-azino-di(3-ethylbenzthiazoline-6-sulfonate) (ABTS) as chromogen. (Stojanov, Marina, et al., Acta Pharmaceutica (Zagreb, Croatia) (1992), 42(1), 69-75.)

10. Detection of hydrogen peroxide produced by microorganisms on the ABTS peroxidase medium. (Mueller, Hans E., et al., Zentralblatt fuer Baketeriologie, Mikrobiologic and Hygiene, Series A: Medical Microbiology, Infectious Diseases, Virology, Parasitology (1985), 259(2), 151-4.)

Exemplary Air-Diffusion Bioelectrocatalytic Cathode According the Invention:

Enzymes catalyze chemical reactions in aqueous environments. Consequently, conventional fuel cells that use enzymes as their catalytic component measure performance of the device operating in an aqueous environment. For the cathode reaction, the concentration of oxygen in a saturated aqueous solution is limited to 240 μM. Consequently, the power density of a fuel cell using a biocathode is oxygen limited. The air-diffusion bioelectrocatalytic cathode of the invention, as describe herein, overcomes this limitation by enabling the biocathode to be operated in humidified air or humidified oxygen. Furthermore, the air diffusion bioelectrocatalytical cathode according to the invention can be used for gas phase fuel cells operating under mild temperatures and pH.

Conventional systems include a laccase-based air cathode. However, in the cathode system according to the invention, a polymer composite is used that comprises polypyrrole embedded with laccase and the redox mediator, ABTS as the bioelectrocatalytic material. This material performs significantly better than prior art systems because ABTS facilitates the kinetics of electron transfer between the cathode and the active site of laccase. Broadly speaking, any redox-active monomer or polymer according to the invention can be used as the bioelectrocatalytic material as described herein. Polymer based systems would usually be preferable over monomer based systems as leakage of a monomer mediator would reduce the lifetime of the air diffusion bioelectrocatalytical cathode. Any conducting polymer can fulfill the role described herein for polypyrrole. Other exemplary enzymes that can be used with a cathode system of the invention include bilirubin oxidase, ceruloplasmin, ascorbate oxidase or copper oxidases as well as any enzyme capable of reducing oxygen to water or to peroxide. Moreover, the invention contemplates applications for a biosensor based on enzymatic catalysis. Such an exemplary enzyme-based biosensor of the invention could function as a gas sensor and, thus, may be more sensitive, faster and accurate than a biosensor operating in solution.

A preferred embodiment of an air diffusion bioelectrocatalytical cathode is the polypyrrole/ABTS/laccase (PAL) system described below, which is provided by electrodeposition of PAL on Toray carbon paper.

A cathode according to the invention performs according to the Sand equation:

$$\frac{i\tau^{1/2}}{C^*} = \frac{nFAD_0^{1/2}\pi^{1/2}}{2} = 85.5nD_0^{1/2}A$$

Figure 8:
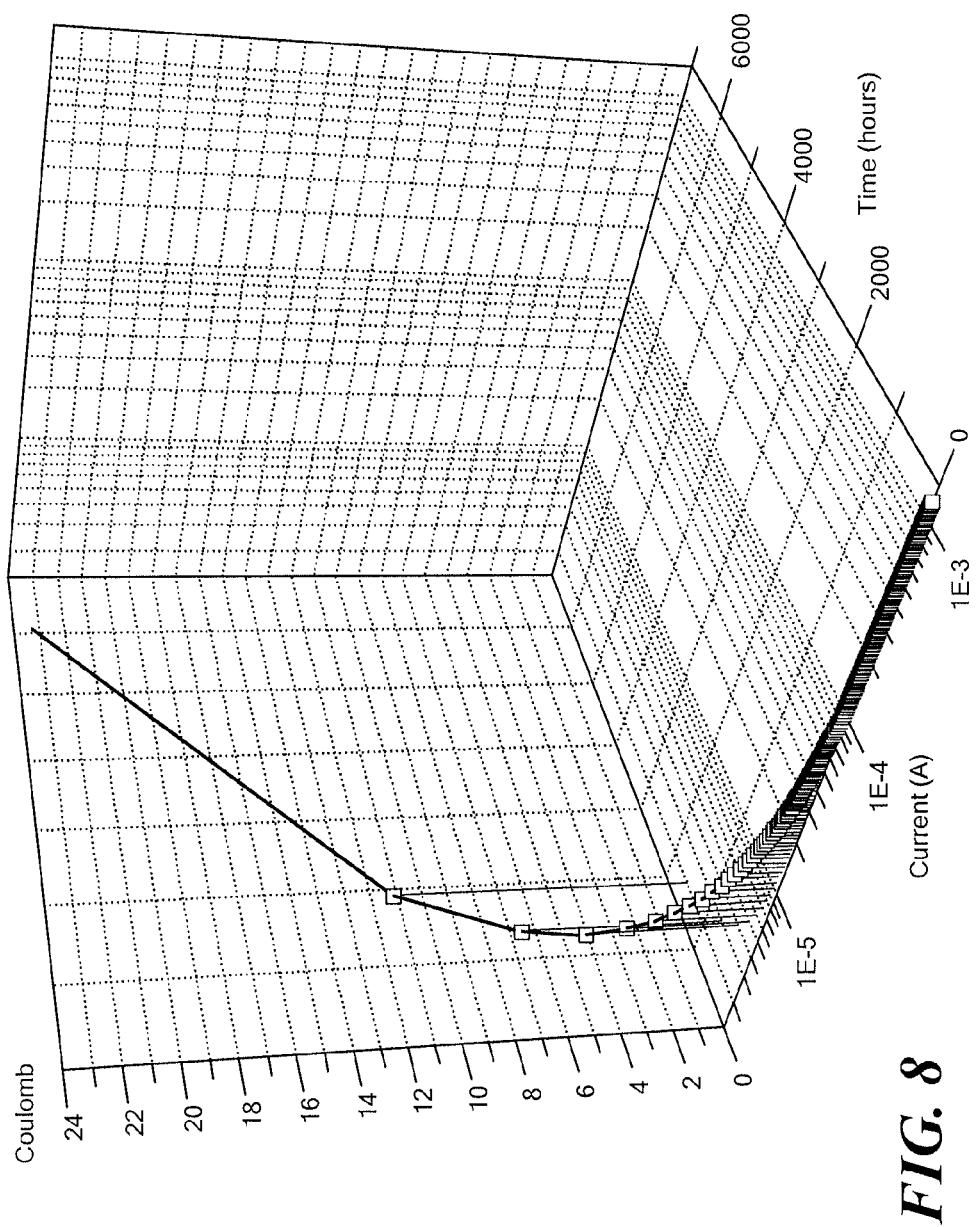
FIG. 8 shows the relationship among current, time and number of coulombs passed during the electrodeposition of a polypyrrole/ABTS/laccase (PAL) system according to the invention on carbon paper.

Because $C^*$, $D_0$ and A are constant, a higher current results in faster electrodeposition. By using the Sand equation given above, the relationship between current, time and coulombs passed during the electrodeposition of PAL on carbon paper can be evaluated, as shown in FIG. 8.

Figure 9:
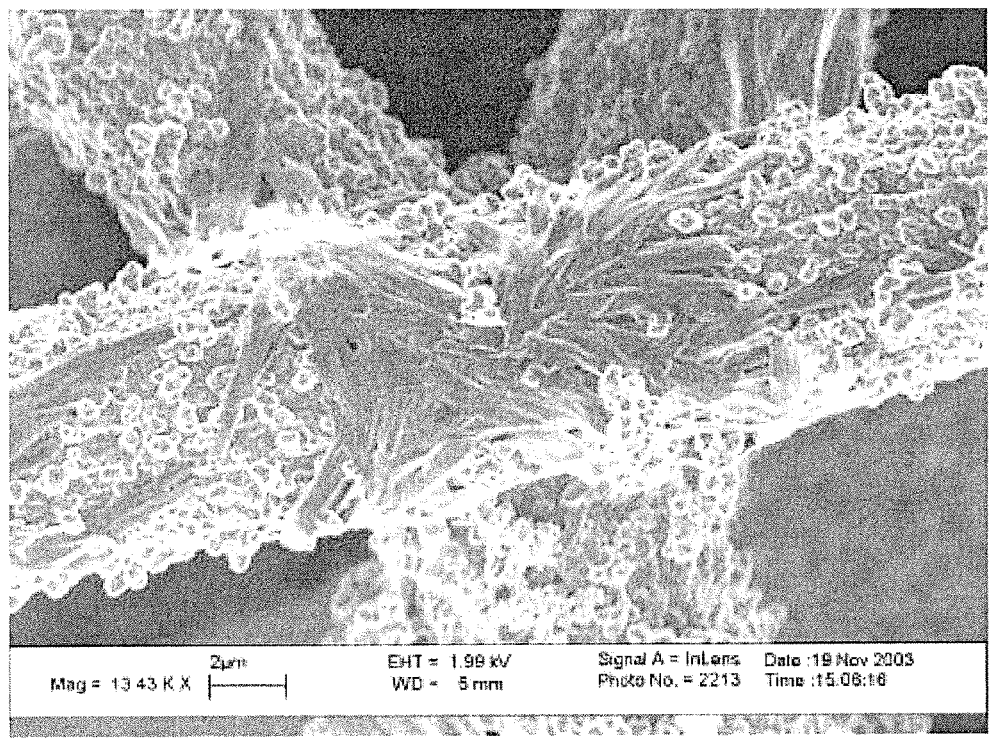
FIG. 9 shows a scanning electromicrograph (SEM) of a PAL electrode system on Toray carbon paper.

Electrodeposition of a bioelectrocatalytic film was achieved by immersing 2.25 cm² Toray carbon paper in an aqueous solution containing 200 mM pyrrole, 25 mM ABTS and 6 mg/ml laccase and applying an oxidizing potential. Conditions for electrodeposition were 400 micro-amperes (μA) constant current for 12.8 hours, resulting in a black film of polypyrrole embedded with ABTS and laccase (PAL). A SEM of a PAL electrode on Toray carbon paper is shown in FIG. 9.

Figure 10A:
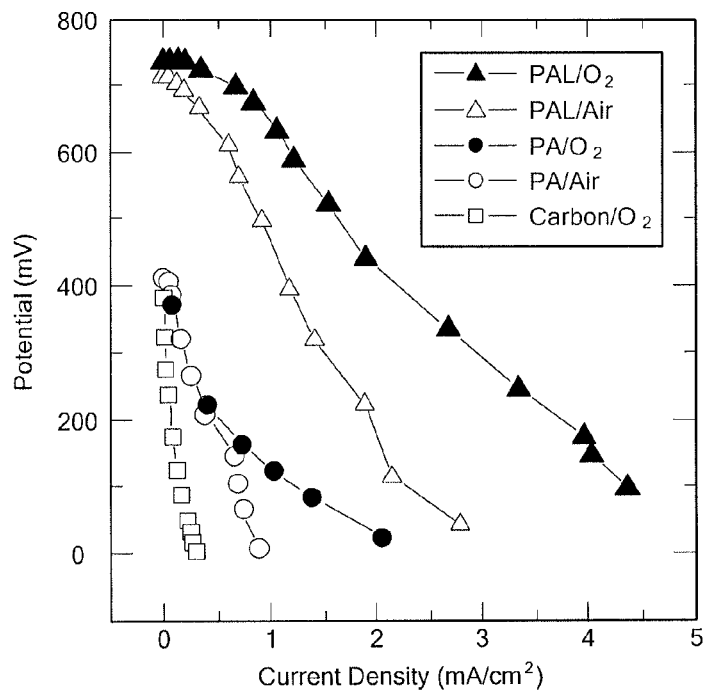
FIG. 10a shows current density versus potential plots obtained from different hydrogen/oxygen fuel cells according to the invention with different cathodes: PAL=with laccase, PA without laccase.
Figure 10B:
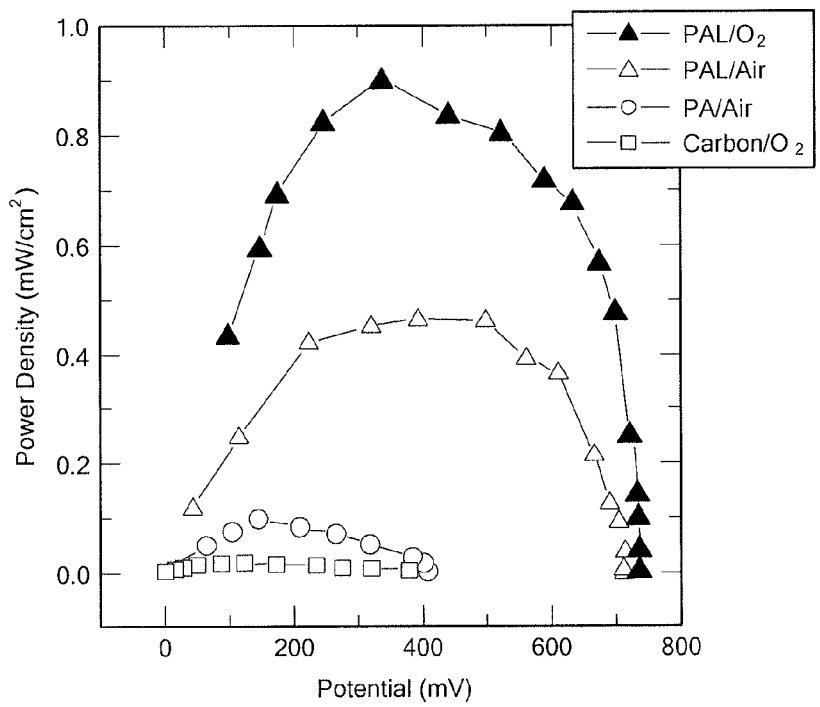

A NAFION (E. I. du Pont de Nemours and Company, Wilmington, Del. 19898) membrane was pretreated prior to use in a fuel cell of the invention by soaking in 1 M hydrochloric acid ($H_2SO_4$) overnight. The anode of the fuel cell of the invention was prepared by coating Toray carbon paper with 0.5 mg/cm² platinum (Pt) (E-TEK 30% Pt on VULCAN 72, Cabot Corporation, Boyertown, Pa. 19512) mixed with a 5% solution of NAFION (NAFION/carbon ratio was 1). Fuel (hydrogen) and oxidant (oxygen) were delivered to the anode and cathode, respectively, as separate humidified streams at room temperature. No liquid phase electrolyte occupied either chamber in the fuel cell of the invention. Different resistors were used to evaluate the potential versus current density curve (FIG. 10a) and the power density versus potential curve (FIG. 10b).

Figure 11:
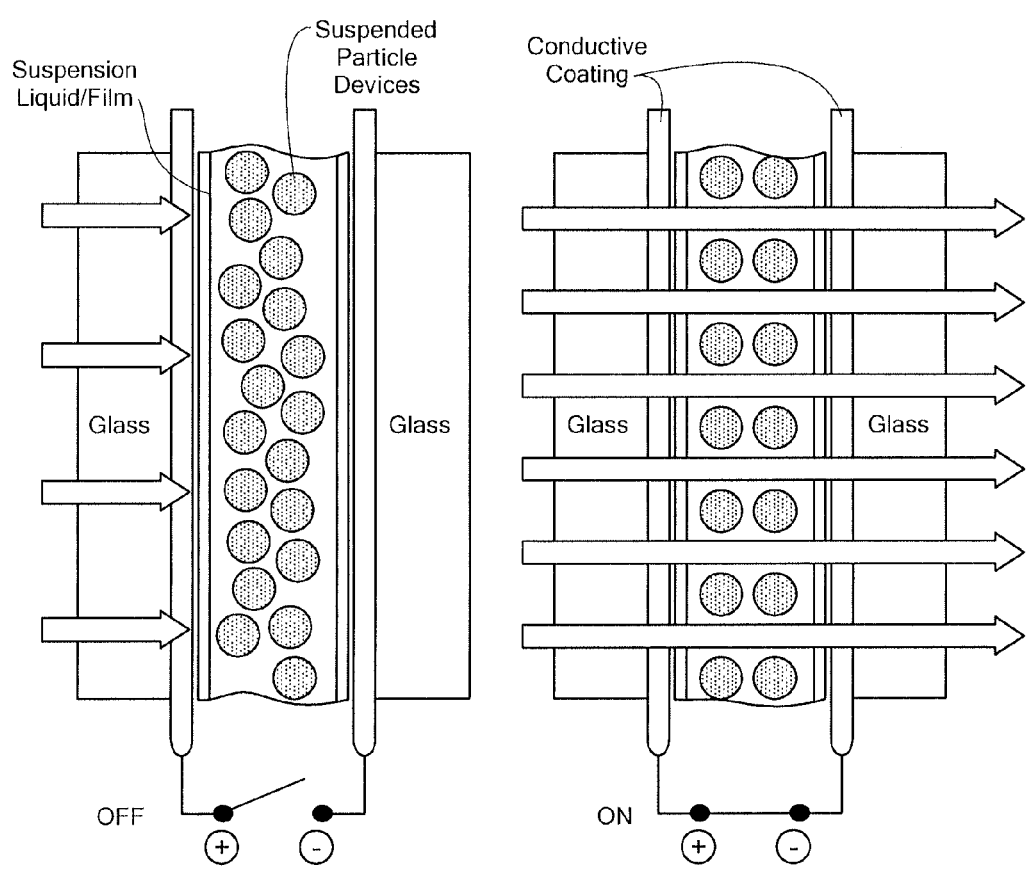
FIG. 11 shows a suspended particle device (SPD) of the invention.

Exemplary Suspended Particle Devices (SPDs) According to the Invention:

One example of an SPD is a chromogenic, or "smart" window, which uses the small light-absorbing microscopic particles of SPDs to enable the window to switch between opaque and clear states in a matter of seconds. The parts, that make up an SPD light-control windows include the following as shown in FIG. 11: two panels of glass or plastic; conductive material (used to coat the panes of glass); suspended particle devices (millions of these black particles are placed between the two panes of glass); liquid suspension or film (allows the particles to float freely between the glass); and control device (automatic or manual).

In an SPD window, millions of the SPDs are placed between two panels of glass or plastic, which is coated with a transparent conductive material. When electricity comes into contact with the SPDs via the conductive coating, they line up in a straight line and allow light (and heat) to flow through. Once the electricity is taken away, they move back into a random pattern and block light. When the amount of voltage is decreased, the window darkens until it is completely dark, after all electricity is taken away.

Users apply a moderate amount of voltage to the conductive material on the window panes through a control device. Several control methods are offered with the SPD light-control windows, including remote and automatic devices. The windows can be controlled manually with a rheostat or remote. Or, photocells and other sensing devices could be used to control the level of light automatically. The invention also contemplates other devices or applications, besides windows, that can be based on an SPD. The redox-active monomers described herein or polymers thereof such as, for example, ABTS monomers and polyABTS can be used in an SPD of the invention such as, for example, an SPD light-control window. For example, an ABTS molecule can be doped inside a very thin layer of conductive polymer by electropolymerization. Or, a thin film of polyABTS can be evaporated onto the optically transparent electrode. Or, the electrode can be modified with a monolayer of ABTS (a derivative containing a siloxane, chlorosilane, or other reactive functional group).

Other exemplary devices of the invention that can comprise a redox-active monomer, polymer, co-polymer or device as described herein are generally described by U.S. Pat. Nos. 6,900,923, 6,301,040 and 6,897,997 as well as U.S. Publication Nos. 2003/0107797 and 2004/0201001.

REFERENCES

1. Shelepin, I. V.; Ushakov, O. A.; Karpova, N. I.; Barachevskii, V. A. *Elektrokhimiya* 1977, 13, 32. (b) Ushakov, O. A.; Shelepin, I. V.; Vasil'ev, Y. B. *Elektrokhimiya* 1979, 15, 1893.
2. Groome, N. P. *J. Clin. Chem. Clin. Biochem.* 1980, 18, 345. (b) Matsuda, H; Tanaka, H; Blas, B. L.; Nosenas, J. S.; Tokawa, T; Ohsawa, S. *Jpn. J. Exp. Med.* 1984, 54, 131. (c) Majkic-Singh, N; Said, B. A.; Spasic, S; Berkes, I. *Ann. Clin. Biochem.* 1984, 21, 504. (d) Kreit, J; Lefebvre, G; Elhichami, A; Germain, P; Saghi, M. *Lipids* 1992, 27, 458. (e) Ukeda, H; Fujita, Y; Ohira, M; Sawamura, M. *J. Agr. Food Chem.* 1996, 44, 3858. (f) Dekker, R. F. H.; Ling, K. Y.; Barbosa, A. M. *Biotechnol. Lett.* 2000, 22, 105.
3. Zhao, J; Henkens, R. W.; Stonehuerner, J; O'Daly, J. P.; Crumbliss, A. L. *J. Electroanal. Chem.* 1992, 327, 109. (b) Gelo-Pujic, M.; Kim, H.-H., Butlin, N. G., Palmore, G. T. R. *Appl. Environ. Microbiol.* 1999, 65, 5515. (c) Tsujimura, S; Tatsumi, H; Ogawa, J; Shimizu, S; Kano, K; Ikeda, T. *J. Electroanal. Chem.* 2001, 496, 69. (c) Dodor, D. E.; Hwang, H. M.; Ekunwe, S. I. N. *Enzyme Microb. Tech.* 2004, 35, 210. (d) Luo, T.-J. M.; Fei, J.; Lim, K. G.; Palmore, G. T. R. *ACS Symposium Series,* 2004, 890, Chapter 10.
4. Palmore, G. T. R.; Kim, H. H. *J. Electroanal. Chem.* 1999, 464, 110.
5. Wrighton, M. S.; Palmore, G. T. R.; Hable, C. T.; and Crooks, R. M. *New Aspects of Organic Chemistry*; Eds. Yoshida Z.; Shiba T.; Ohshiro Y. VCH Publishers: New York, 1989, 277. (b) Christ, Jr., C. S.; Yu, J.; Zhao, X.; Palmore, G. T. R.; Wrighton, M. S. *Inorg. Chem.* 1992, 31, 4439. (c) Palmore, G. T. R.; Smith, D. K.; Wrighton, M. S. *J. Phys. Chem. B* 1997, 101, 2437.
6. Palmore, G. T. R.; Whitesides, G. M. *ACS Symposium Series* 1994, 566, 271. (b) Palmore, G. T. R.; Bertschy, H.; Bergens, S., H.; Whitesides, G. M. *J. Electroanal. Chem.* 1998, 443, 155. (c) Palmore, G. T. R. *Trends Biotechnol.* 2004, 22, 99.
7. Foulds N. C. and Lowe C. R. *Anal. Chem.* 1988, 60, 2473 (b) Gregg B. A.; Heller A. *Anal. Chem.* 1990, 62, 258.
8. D'Amico, J. J.; Bollinger, F. G. *J. Heterocycl. Chem.* 1988, 25, 1601. (b) D'Amico, J. J.; Bollinger, F. G. *J. Heterocycl. Chem.* 1989, 26, 655. (c) D'Amico, J. J.; Bollinger, F. G. *J. Heterocycl. Chem.* 1989, 26, 1245.
9. Kiprianov, A. I.; Pazenko, Z. N. Russ. *J. Gen. Chem.* 1949, 19, 1519. (b) Duro, F.; Scapini, G.; Vittorio, F. Farmaco-Ed Sci. 1975, 30, 208.
10. Abd, E.; Eatedal, H. M.; Mellor, J. M. *J. Chem. Soc., Chem. Commun.* 1986, 7, 576. (b) Abd, E.; Eatedal, H. M.; Ashmawy, M. I.; Mellor, J. M. *J. Chem. Soc., Perkin Trans.* 1 1986, 12, 2729. (c) Nagasawa, H. T.; Elberling, J. A.; Roberts, J. C. *J. Med. Chem.* 1987, 30, 1373.
11. Corbin, J. L.; Work, D. E. *J. Org. Chem.* 1976, 41, 489.
12. Sohar, P.; Denny, G. H.; Babson, R. D. *J. Heterocycl. Chem.* 1969, 6, 163. (b) Scheibye, S.; Kristensen, J.; Lawesson, S. O. *Tetrahedron* 1979, 35, 1339.
13. Klose, S.; Deneke, U.; Haid, E.; Weimann, G. U.S. Pat. No. 4,101,381. (b) Douglas, J. S.; Drexler, K. R. U.S. Pat. No. 5,989,845.
14. Sutoris, V.; Gaplovsky, A.; Sekerka, V. *Chem. Pap.* 1986, 40, 103.
15. Fahmy, H. T. Y.; Rostom, S. A. F.; Saudi, M. N.; Zjawiony, J. K.; Robins, D. J. *Arch. Pharm.* 2003, 336, 216.
16. Bard, A. J.; Faulkner, L. R. *Electrochemical Methods*; Wiley: New York, N.Y., 1980.
17. Daum, P.; Lenhard, J. R.; Rolison, D.; Murray, R. W. *J. Am. Chem. Soc.* 1980, 102, 6469. (b) Anson, F. C.; Saveant, J. M.; Shigehara, K. *J. Phys. Chem.* 1983, 87, 214.
18. Nicholson, R. S. *Anal. Chem.* 1965, 37, 1351.
19. D. Naegele, R. Bittihn, *Solid State Ion.* 1988, 28, 983.
20. P. Novak, K. Muller, K. S. V. Santhanam, O. Haas, *Chem Rev* 1997, 97, 207.
21. C. Arbizzani, M. Mastragostino, L. Meneghello, *Electrochim Acta* 1996, 41, 21.
22. N. C. Billingham, P. D. Calvert, in *Advances in polymer science*, Vol. 90 (Eds: H. Benoit, H. Cantow), Springer-Verlag, New York 1989, 1.

While the present invention has been described in conjunction with a preferred embodiment, one of ordinary skill, after reading the foregoing specification, will be able to effect various changes, substitutions of equivalents, and other alterations to that set forth herein. It is therefore intended that the protection granted by Letters Patent hereon be limited only by the definitions contained in the appended claims and equivalents thereof.

What is claimed is:
1. A redox-active, conducting polymer energy storage system, said system comprising:
an electrode and a counter electrode,
wherein said electrode comprises a first conducting polymer and said counter electrode comprises a second conducting polymer, wherein said first conducting polymer is doped by at least one or more first redox-active compounds and/or by a polymer and/or a co-polymer of said one or more first redox-active compounds and said second conducting polymer is doped by at least one or more second redox-active compounds and/or by a polymer and/or a co-polymer of said one or more second redox-active compounds, and wherein there is a potential difference between the dopant for the electrode and the dopant for the counter electrode.

2. The redox-active, conducting polymer energy storage system according to claim 1, wherein at least one of the dopant for the electrode and/or the dopant for the counter electrode comprises a monomer, and/or a polymer and/or a co-polymer of a monomer, having the structure:

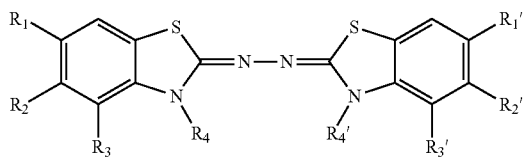

wherein $R_1$ and $R_1'$ are selected from the group consisting of MeO, EtO, $COF_3$, $SO_4H$, $SO_3^-$, $SO_3H$, H, $CHNO_4S_2F_3$, $C_5H_4N_2O_6S_2F_6$, $C_{10}H_{10}N_4S_2$, $CH_3$, n-Bu, Cl, $NH_2$, EtN, Br, alkyl, ether, ester, sulfonate, ammonium, carboxylate, amine, phosphonate and any combination thereof;

$R_2$ and $R_2'$ are selected from the group consisting of MeO, EtO, $COF_3$, $SO_4H$, $SO_3^-$, $SO_3H$, H, $CHNO_4S_2F_3$, $C_5H_4N_2O_6S_2F_6$, $C_{10}H_{10}N_4S_2$, $CH_3$, n-Bu, Cl, $NH_2$, EtN, Br, alkyl, ether, ester, sulfonate, ammonium, carboxylate, amine, phosphonate and any combination thereof;

$R_3$ and $R_3'$ are selected from the group consisting of MeO, EtO, $COF_3$, $SO_4H$, $SO_3^-$, $SO_3H$, H, $CHNO_4S_2F_3$, $C_5H_4N_2O_6S_2F_6$, $C_{10}H_{10}N_4S_2$, $CH_3$, n-Bu, Cl, $NH_2$, EtN, Br, alkyl, ether, ester, sulfonate, ammonium, carboxylate, amine, phosphonate and any combination thereof; and $R_4$ and $R_4'$ are selected from the group consisting of MeO, EtO, $COF_3$, $SO_4H$, $SO_3^-$, $SO_3H$, $CHNO_4S_2F_3$, $C_5H_4N_2O_6S_2F_6$, $C_{10}H_{10}N_4S_2$, n-Bu, Cl, $NH_2$, EtN, Br, alkyl, ether, ester, sulfonate, ammonium, carboxylate, amine, phosphonate, $CH_3$, H, $C_2H_5$, $C_4H_9$, $C_6H_5$, $C_8H_{17}$, $C_2H_5S$, $C_3H_7S$, $C_4H_8Br$, $C_{10}H_{23}N$, $C_{20}H_{21}N_2$, $C_{18}H_{25}N_2$, $C_{21}H_{23}N_2$, $C_{31}H_{29}N_2O_2$, $C_{22}H_{25}N_4$, $C_{20}H_{25}N_2$, $C_3H_7OS$, unsaturated carbon monomers, olefins, halo-olefins, dienes, acetylenes, styrenes, vinyl compounds, acrylic acids, acrylics, ring monomers, cyclic ethers, lactones, lactams, cyclic amines, cyclic sulfides, cyclic carbonates, cyclic acid anhydrides, cyclic iminoethers, amino acid N-carboxy anhydrides, cyclic imides, phosphorus containing cyclic compounds, silicon containing cyclic compounds, cyclic olefins, bifunctional monomers, phenols, melamines, ureas, diamines, dicarboxylic acids, hydroxy acids, oxy carboxylic acids, amino acids, amino carboxylic acids, diols, diisocyanates, sulfur containing compounds, phosphorus containing compounds, aromatic ethers, dihalides, dihalogenated compounds, aldehydes, diketones and carbonates, carbonic acid derivatives, anilines, silane compounds and any combination thereof; wherein only one of $R_4$ and $R_4'$ can be selected from the group consisting of $CH_3$, H, $C_2H_5$, $C_4H_9$, MeO, EtO, $COF_3$, $SO_4H$, $SO_3^-$, $SO_3H$, $CHNO_4S_2F_3$, $C_5H_4N_2O_6S_2F_6$, $C_{10}H_{10}N_4S_2$, n-Bu, Cl, $NH_2$, EtN, Br, alkyl, ether, ester, sulfonate, ammonium, carboxylate, amine, phosphonate and any combination thereof.

3. The redox-active, conducting polymer energy storage system according to claim 2, wherein, in said monomer:

$R_1$ and $R_1'$ are selected from the group consisting of MeO, EtO, $COF_3$, $SO_4H$, $SO_3^-$, $SO_3H$, H, $CHNO_4S_2F_3$, $C_5H_4N_2O_6S_2F_6$, $C_{10}H_{10}N_4S_2$, $CH_3$, n-Bu, Cl, $NH_2$, EtN, Br, alkyl, ether, ester, sulfonate, ammonium, carboxylate, amine, phosphonate and any combination thereof;

$R_2$ and $R_2'$ are H;

$R_3$ and $R_3'$ are H; and $R_4$ and $R_4'$ are selected from the group consisting of MeO, EtO, $COF_3$, $SO_4H$, $SO_3^-$, $SO_3H$, $CHNO_4S_2F_3$, $C_5H_4N_2O_6S_2F_6$, $C_{10}H_{10}N_4S_2$, n-Bu, Cl, $NH_2$, EtN, Br, alkyl, ether, ester, sulfonate, ammonium, carboxylate, amine, phosphonate, $CH_3$, H, $C_2H_5$, $C_4H_9$, $C_6H_5$, $C_8H_{17}$, $C_2H_5S$, $C_3H_7S$, $C_4H_8Br$, $C_{10}H_{23}N$, $C_{20}H_{21}N_2$, $C_{18}H_{25}N_2$, $C_{21}H_{23}N_2$, $C_{31}H_{29}N_2O_2$, $C_{22}H_{25}N_4$, $C_{20}H_{25}N_2$, $C_3H_7OS$, unsaturated carbon monomers, olefins, halo-olefins, dienes, acetylenes, styrenes, vinyl compounds, acrylic acids, acrylics, ring monomers, cyclic ethers, lactones, lactams, cyclic amines, cyclic sulfides, cyclic carbonates, cyclic acid anhydrides, cyclic iminoethers, amino acid N-carboxy anhydrides, cyclic imides, phosphorus containing cyclic compounds, silicon containing cyclic compounds, cyclic olefins, bifunctional monomers, phenols, melamines, ureas, diamines, dicarboxylic acids, hydroxy acids, oxy carboxylic acids, amino acids, amino carboxylic acids, diols, diisocyanates, sulfur containing compounds, phosphorus containing compounds, aromatic ethers, dihalides, dihalogenated compounds, aldehydes, diketones and carbonates, carbonic acid derivatives, anilines, silane compounds and any combination thereof; wherein only one of $R_4$ and $R_4'$ can be selected from the group consisting of $CH_3$, H, $C_2H_5$, $C_4H_9$, MeO, EtO, $COF_3$, $SO_4H$, $SO_3^-$, $SO_3H$, $CHNO_4S_2F_3$, $C_5H_4N_2O_6S_2F_6$, $C_{10}H_{10}N_4S_2$, n-Bu, Cl, $NH_2$, EtN, Br, alkyl, ether, ester, sulfonate, ammonium, carboxylate, amine, phosphonate and any combination thereof.

4. The redox-active, conducting polymer energy storage system according to claim 1, wherein said energy storage system is a battery.

5. The redox-active, conducting polymer energy storage system according to claim 1, wherein said energy storage system is a capacitor.

6. The redox-active, conducting polymer energy storage system according to claim 2, wherein at least one of the dopant for the electrode and/or the dopant for the counter electrode comprises a co-polymer of said monomer and acrylic acid.

7. The redox-active, conducting polymer energy storage system according to claim 2, wherein at least one of the dopant for the electrode and/or the dopant for the counter electrode comprises a co-polymer of said monomer and 1-vinyl imidazole.

8. The redox-active, conducting polymer energy storage system according to claim 1, wherein at least one of the dopants for the electrode is 2,2'-azinobis(3-ethylbenzothiazoline-6-sulfonate) and wherein at least one of the dopants for the counter electrode is indigo carmine.

9. The redox-active, conducting polymer energy storage system according to claim 8, wherein at least one of the first conducting polymer and the second conducting polymer is an organic polyheterocyclic.

10. The redox-active, conducting polymer energy storage system according to claim 9, wherein at least one of the first conducting polymer and the second conducting polymer is selected from the group consisting of polypyrrole, polythiophene, polyaniline and derivatives thereof.

11. The redox-active, conducting polymer energy storage system according to claim 10, wherein at least one of the first conducting polymer and the second conducting polymer is polypyrrole.

12. The redox-active, conducting polymer energy storage system according to claim 1, wherein at least one of the first conducting polymer and the second conducting polymer is an organic polyheterocyclic.

13. The redox-active, conducting polymer energy storage system according to claim 12, wherein at least one of the first conducting polymer and the second conducting polymer is selected from the group consisting of polypyrrole, polythiophene, polyaniline and derivatives thereof.

14. The redox-active, conducting polymer energy storage system according to claim 13, wherein at least one of the first conducting polymer and the second conducting polymer is polypyrrole.

* * * * *